No. 740,633. PATENTED OCT. 6, 1903.
J. DOWNING.
AGRICULTURAL IMPLEMENT.
APPLICATION FILED DEC. 13, 1902.
NO MODEL. 2 SHEETS—SHEET 1.
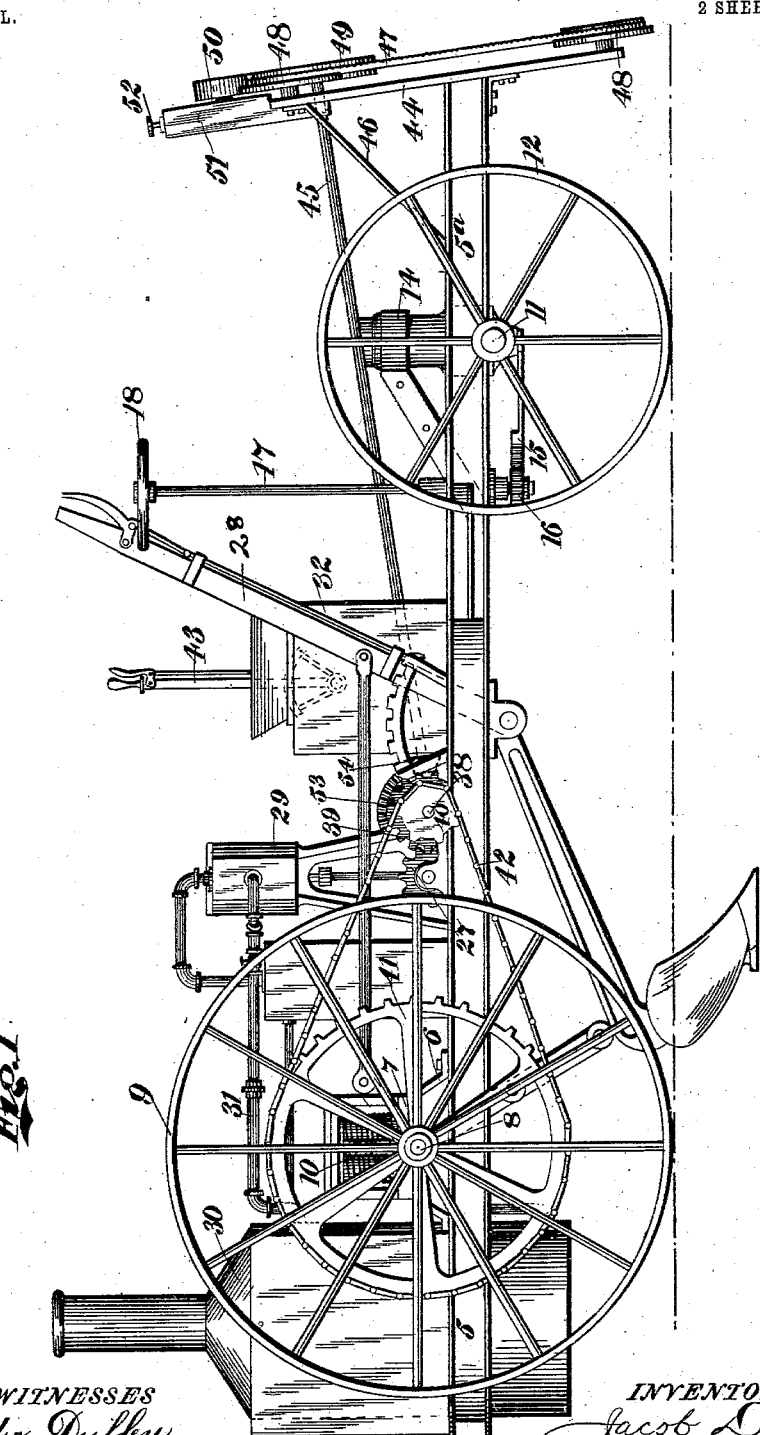
WITNESSES
INVENTOR
Jacob Downing
By
Alexander & Sowell
Attorneys No. 740,633. PATENTED OCT. 6, 1903.
J. DOWNING.
AGRICULTURAL IMPLEMENT.
APPLICATION FILED DEC. 13, 1902.
NO MODEL. 2 SHEETS—SHEET 2.
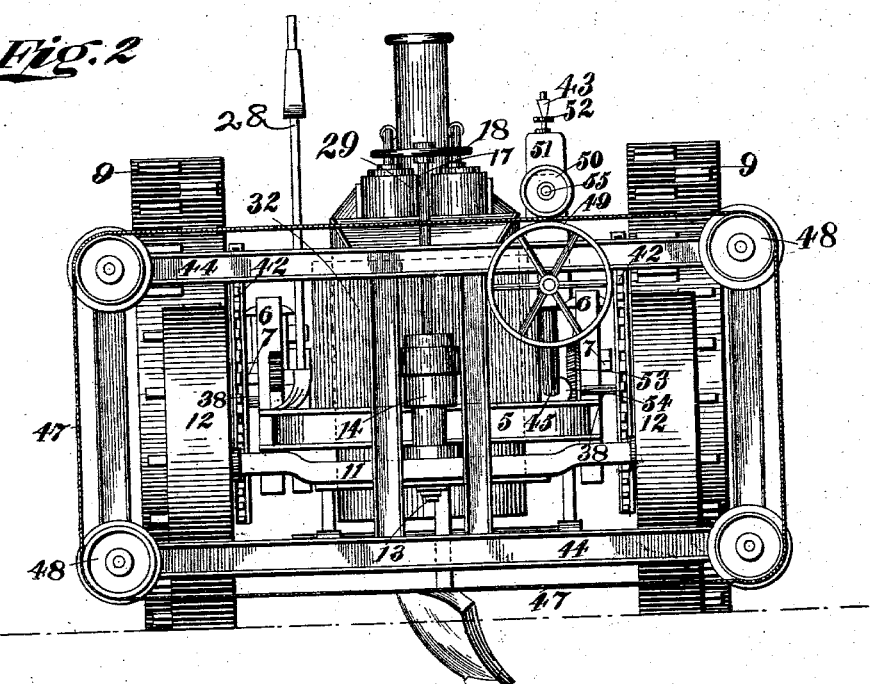
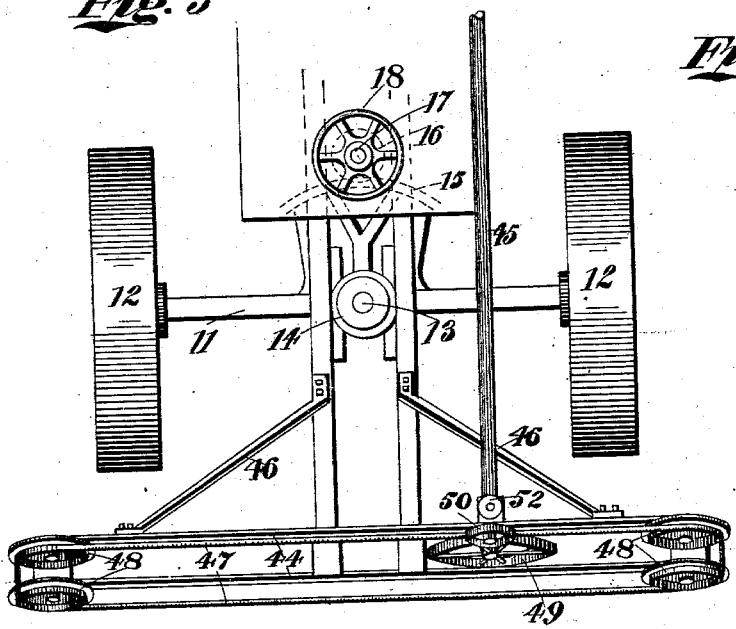
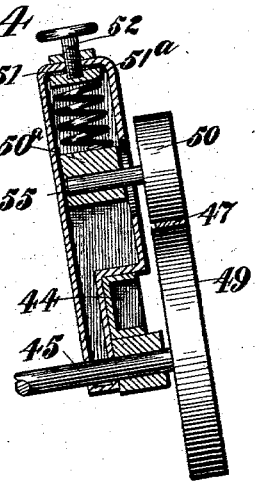

No. 740,633. Patented October 6, 1903.

UNITED STATES PATENT OFFICE.

JACOB DOWNING, OF DENVER, COLORADO.

AGRICULTURAL IMPLEMENT.

SPECIFICATION forming part of Letters Patent No. 740,633, dated October 6, 1903.

Original application filed October 4, 1902, Serial No. 125,903. Divided and this application filed December 13, 1902. Serial No. 135,156. (No model.)

*To all whom it may concern:*

Be it known that I, JACOB DOWNING, of Denver, in the county of Arapahoe and State of Colorado, have invented certain new and useful Improvements in Agricultural Implements; and I hereby declare that the following is a full, clear, and exact description thereof, reference being had to the accompanying drawings, which form part of this specification.

This invention is an improvement in agricultural implements—such as mowers, &c.; and its object is to provide an automobile-power-actuated mower the engine part of which can be utilized for heavy-draft purposes upon the farm for general work thereon.

The present application is a division of the application for "Agricultural implements," filed by me October 4, 1902, Serial No. 125,903; and the invention covered herein consists in the novel construction of the cutting apparatus of the machine, whereby it is adapted for use in mowing grain, grass, &c., and the particular features upon which protection is desired are set forth in the claims, to which I refer for summaries of the invention.

In the accompanying drawings, which embody the invention, Figure 1 is a side view of the complete machine, with the exception that portions of the reversing mechanism of the engine are omitted. Fig. 2 is a front view thereof. Fig. 3 is a detail top view of the cutting apparatus. Fig. 4 is a detail.

The main frame 5 of the machine is preferably constructed as described in my aforesaid application, its side members converging at front and being rigidly united to a casting 14, beyond which the side members of the machine are extended, as indicated at 5ª, for a purpose hereinafter explained. In this casting 14 is journaled a king-pin 13, which is rigidly connected with the front or steering axle 11, and thereby connects the same to the frame, the front wheels 12 being journaled on the ends of axle 11 in the ordinary manner. Attached to axle 11 is a segment 15, which meshes with a pinion 16 on the lower end of a vertical shaft 17, suitably journaled on the main frame of the machine and having on its upper end a hand-wheel 18, by which it can be conveniently operated by the driver, who has a seat upon a tank 32, supported on the frame in rear of the front axle, and which tank may be used as a water-tank. The rear end of the frame is supported on an axle 8, which has bearings in journal-blocks 7, guided in yokes 6, rigidly attached to the sides of the frame, springs 10 being interposed between the bearings 7 and the tops of the yokes 6, so as to cushion the frame upon the axle.

The axle 8 is rotatable in the bearings 7 and also rotatable in the hubs of the driving-wheels 9, as described in my said application. The wheels 9 are provided with sprockets 41 on their inner sides, which may be driven by sprocket-chains 42 from smaller sprockets 40 on a main driving-shaft 38, suitably journaled in the frame in front of the wheels 9 and driven by means of pinions 39 and 27 from the shaft of engine 29. The engine may be of any suitable construction, but is preferably a double-cylinder steam-engine mounted upon the frame in advance of the rear axle and in rear of the water-tank 32 and supplied with steam from a boiler 30 by pipe 31.

A plow or series of plows or other implements may be suspended from the main frame, as indicated in the drawings and described in my aforesaid application. Where only one or two plows are used, they may be made adjustable laterally of the machine, so as to compensate or correct any tendency of the machine to turn sidewise, as it might when operating in very heavy soil, where the traction of the wheel on the plowed ground would be less than the traction of the wheel on the solid ground.

To the forward extension 5ª of the main frame is attached the cutting apparatus, consisting of a rectangular frame 44, which is of greater breadth than height and preferably broader than the extreme width of the machine. This frame is slightly inclined backward, so that the cutting band or belt will operate at a slight angle. At each corner of said frame are pulleys 48, over which is guided an endless-band cutter 47, which may be made of a toothed endless band of steel; but the specific construction of such cutter is not claimed herein. The pulleys 48 have flanges on their rear ends, so as to guide and retain the band-cutter in position without interfering with the teeth thereof. The endless cutter is traveled over the pulleys by suitable means. I preferably use a frictional drive consisting of the friction-pulley 49, (which is mounted on a driven shaft 45, suitably journaled in the frame below the upper run of the cutter,) and a friction-pulley 50, which is journaled on a stub-shaft 55, mounted on a slide 50ª, guided in a yoke 51, attached to the top bar of frame 44 and depressed by a spring 51ª, the tension of which is regulable by reason of a hand-screw 52, attached to the upper end of the yoke 51. By this means the endless cutter can be traveled at the desired speed without danger of breaking it if it should catch some non-yielding obstruction.

The shaft 45 extends rearwardly to a point adjacent to the shaft 38, where it is suitably journaled on the main frame and is provided with a small beveled pinion 54, meshing with a large beveled gear 53 on shaft 38, so that the endless cutter is traveled over the pulleys 48 simultaneously with the bodily forward or backward movement of the main frame and cutting apparatus. If it is not desired to use the cutter, it can be readily removed from position by simply loosening the hand-screw 52, which will allow the cutter to be slipped from between the pulleys 49 and 50. The frame 44 may be braced in any suitable manner, as indicated by stays 46 of the drawings.

43 shows the operating-lever for reversing the engine, the mechanism for doing which is old, and therefore is not shown in the drawings.

The operation of the apparatus may be briefly stated, as follows: A single plow or a number of plows, if desired, may be suspended from the frame, as above explained, and when the machine reaches the point where it is desired to operate the plows are lowered into working position. In operating upon ground where there is a large growth of grass or weeds, such as is frequently found on prairie land, the cutter will clear the ground in advance of the plows and greatly facilitate the operation of the latter and the turning under and covering up of the vegetable growth. Where it is desired to use the machine simply for mowing, the plows can be omitted or may be lifted out of operative position. It is obvious that both the plows and the cutter may be thrown out of operation, and the machine could then be used as a draft-engine for hauling heavy loads on the farm and as a general-utility draft-machine.

While I have illustrated in the drawings a plow connected to the main frame, in practice other farming implements, such as a harrow or pulverizer, may be used either with or as a substitute for the plow, and these or some other heavy implement could be raised and lowered in position, like the plow, at the will of the operator, by means of the lever 28.

It is not essential in every case that the cutting apparatus should be attached to the traction-machine shown as, of course the cutting apparatus on the front end of the frame could be attached to other automobiles or traction-engines. The combination of the cutting apparatus and plows, &c., in a single machine, however, renders the latter of more value to the farmer, particularly on prairie lands. It is also obvious that the cutting apparatus could be employed on a machine-frame propelled by animal-power.

Having thus described my invention, what I therefore claim as new, and desire to secure by Letters Patent thereon, is—

1. The combination with the main frame, and mechanism for propelling it; with a cutting apparatus attached to the main frame in advance of the steering-wheels, consisting of a rectangular frame, an endless cutter running around said frame, a pair of pulleys for driving said endless cutter engaging the upper run thereof, one of said pulleys being movable toward or from the other, and means for rotating said pulleys from the driving mechanism of the machine, substantially as described.

2. The combination with the main frame, and mechanism for propelling it, with a cutting apparatus attached to the main frame in advance of the steering-wheels, consisting of a rectangular frame, guide-pulleys at the corners of said frame, an endless cutter running over said pulleys, a pair of frictional pulleys for driving said endless cutter engaging the upper run thereof, one of said pulleys being movable toward or from the other, and means for rotating said pulleys from the driving mechanism of the machine.

3. The combination of the main frame, a rectangular cutter-frame of greater width than the main frame attached to the front thereof, the flanged guide-pulleys journaled on said cutter-frame, an endless cutter passing around the pulleys, a fixed friction-pulley, and a movable friction-pulley engaging the upper run of the cutter, the shaft carrying the fixed friction-pulley, and gearing for driving said shaft from the power-shaft of the machine, substantially as described.

4. The combination of the main frame, the engine and connections for driving the same, and the steering axle and wheels, with the cutter-frame of greater width than the main frame attached to an extension thereof in front of the steering-wheels, flanged guide-pulleys journaled at the corners of said cutter-frame, an endless cutter passing around said pulleys, a fixed friction-pulley, and a movable friction-pulley engaging the upper run of the endless cutter, a shaft carrying the fixed friction-pulley, and gearing for driving said shaft from the power-shaft of the machine, substantially as described.

5. The combination of the main frame, its steering-wheels, and driving mechanism, a cutter-frame attached to the main frame in advance of the wheels, said frame having pulleys at its corners, an endless cutter guided on and running over said pulleys, and means for driving said cutter comprising fixed and movable friction-pulleys, the shaft and gearing for driving said friction-pulleys from the main driving-shaft on the frame in rear of the steering-wheels, substantially as described.

6. The combination of the main frame, the steering-axle, the main axle journaled on the rear end of said frame, the driving-wheels, the engine supported on the main frame, a driving-shaft journaled in the main frame and operated from said engine, and gearing for driving the main wheels from said main shaft; with a cutter-frame attached to an extension of the main frame in advance of the steering-wheels, and cutting apparatus supported on said frame comprising a series of pulleys and an endless-belt cutter running thereover, fixed and movable friction-pulleys for driving said belt, and a shaft driven from the main shaft and carrying one of the said friction-pulleys driving the belt-cutter, substantially as described.

In testimony that I claim the foregoing as my own I affix my signature in presence of two witnesses.

JACOB DOWNING.

In presence of—
WALTER S. WIKOFF,
JOHN A. McINTYRE.